(12) United States Patent
Toyoda et al.

(10) Patent No.: US 6,785,519 B2
(45) Date of Patent: Aug. 31, 2004

(54) PORTABLE TELEPHONE

(75) Inventors: Junichi Toyoda, Tokyo (JP); Katsumi Okayama, Kanagawa (JP)

(73) Assignee: Sony Corporation, Tokyo (JP)

( * ) Notice: Subject to any disclaimer, the term of this patent is extended or adjusted under 35 U.S.C. 154(b) by 330 days.

(21) Appl. No.: 10/034,407

(22) Filed: Dec. 27, 2001

(65) Prior Publication Data

US 2002/0160725 A1 Oct. 31, 2002

(30) Foreign Application Priority Data

Dec. 27, 2000 (JP) .................................... P2000-397345

(51) Int. Cl.$^7$ ................................................ H04B 1/38
(52) U.S. Cl. .................... 455/90.1; 455/90.3; 455/300; 455/301; 455/106; 455/575.1; 455/575.5; 455/575.7; 455/128; 455/117
(58) Field of Search .............................. 455/90.1, 300, 455/301, 90.3, 575.1, 569.1, 550.1, 106, 575.8, 575.7, 575.5, 117, 128, 83; 343/702, 841

(56) References Cited

U.S. PATENT DOCUMENTS

| | | | | |
|---|---|---|---|---|
| 5,527,676 A | * | 6/1996 | Vogelstein et al. ............. | 435/6 |
| 5,539,148 A | | 7/1996 | Konishi et al. | |
| 5,541,609 A | * | 7/1996 | Stutzman et al. ........... | 343/702 |
| 5,731,964 A | * | 3/1998 | Kitakubo et al. ........... | 361/816 |
| 5,777,586 A | * | 7/1998 | Luxon et al. ................ | 343/702 |
| 5,826,201 A | * | 10/1998 | Gratias .................... | 455/575.5 |
| 5,854,970 A | * | 12/1998 | Kivela ...................... | 455/575.7 |
| 5,989,720 A | * | 11/1999 | Taniyama ................... | 428/450 |
| 6,041,220 A | * | 3/2000 | Suguro ..................... | 455/575.7 |
| 6,095,820 A | * | 8/2000 | Luxon et al. ................ | 343/702 |
| 6,150,983 A | * | 11/2000 | Massey ..................... | 343/702 |
| 6,341,217 B1 | * | 1/2002 | Wong ...................... | 455/575.5 |
| 6,356,773 B1 | * | 3/2002 | Rinot ...................... | 455/575.1 |
| 6,615,026 B1 | * | 9/2003 | Wong ...................... | 455/575.5 |

FOREIGN PATENT DOCUMENTS

| | | |
|---|---|---|
| WO | WO 95/31048 | 11/1995 |
| WO | WO 97/36380 | 10/1997 |

* cited by examiner

Primary Examiner—Marceau Milord
(74) Attorney, Agent, or Firm—Sonnenschein, Nath & Rosenthal LLP

(57) ABSTRACT

The portable telephone capable of more effectively reducing the electromagnetic energy to be radiated therefrom and absorbed by the human body during its use is provided. The portable telephone is comprised of: an antenna; a microphone; a transmitting circuit for modulating a first audio signal to produce a first radio signal, and transmitting the same; a receiving circuit for demodulating a second radio signal received via the antenna, and reproducing a second audio signal; a receiver for outputting an audio sound corresponding to the second audio signal; a printed circuit board on which the receiving and the transmitting circuits are mounted; a shield case surrounding the printed circuit board so as to suppress the electromagnetic interference between the printed circuit board and the antenna; the housing for accommodating the shield case and so on; the electromagnetic wave absorption layer including a magnetic loss material, formed at least in a part between the shield case and the housing; and the electromagnetic wave reflection layer including a magnetic reflection material, formed between the housing and the electromagnetic wave absorption layer.

14 Claims, 7 Drawing Sheets

PORTABLE TELEPHONE

CROSS REFERENCES TO RELATED APPLICATIONS

The present document is based on Japanese Priority Document JP 2000-397345, filed in the Japanese Patent Office on Dec. 27, 2000, the entire contents of which being incorporated herein by reference.

BACKGROUND OF THE INVENTION

1. Field of the Invention

The present invention relates to a portable telephone and, in particular, it relates to a portable telephone capable of minimizing absorption of an electromagnetic energy radiated therefrom by a human body when in use thereof.

2. Description of the Related Art

FIG. 6 is a schematic diagram showing a conventional portable telephone. As shown in FIG. 6, a portable telephone 201 is used being held in a close proximity to a head (HEAD) of a user. The portable telephone 201 is comprised of an antenna 31, a feeder 32, a printed board 33, a shield case 34, semiconductor integrated circuits 35A and 35B, a microphone 36, a keypad 37, a liquid crystal display 38, a speaker 39 and an insulated housing 40.

The antenna 31 for use of signal transmission and reception is allowed to project upward from an upper edge of the housing 40 for transmitting electromagnetic waves to a base station in a transmission mode and receiving electromagnetic waves from the base station in a reception mode. The antenna 31 is a retractable antenna capable of retracting in a longitudinal direction of the housing 40.

On one surface of the printed board 33, there is mounted a semiconductor integrated circuit 35A constructed including transistors, capacitors, resistors and so on. Also, on the other surface of the printed board 33, there is mounted a semiconductor integrated circuit 35B constructed likewise.

The printed board 33 and the semiconductor integrated circuits 35A and 35B in combination constitute a printed circuit board 35. On this printed circuit board 35, there are mounted a switch circuit, a control circuit, a transmitting circuit and a receiving circuit. Between the antenna 31 and the transmitting and the receiving circuits are connected via the switch circuit and the feeder section 32.

The microphone 36 constitutes a transmitter (telephone microphone), and the speaker 39 constitutes a receiver (telephone earphone). The housing 40 is provided with an opening 36H for the microphone 36, an opening 39H for the speaker 39, a window 38W for the liquid crystal display section 38 and the like. The housing 40 accommodates the printed circuit board 35, the shield case 34, the microphone 36 and the speaker 39.

A voice or sound uttered by the user is supplied to the microphone 36 through the opening 36H. The microphone to which the sound or the like uttered by the user is input generates a first audio signal corresponding to the sound uttered by the user. The printed circuit board 35 converts the first audio signal to a first radio signal. The first radio signal is transmitted from the antenna 31 to the base station. The base station sends a second radio signal to the portable telephone 201.

The printed circuit board 35 converts the second radio signal having been input to the antenna 31 into a second audio signal to be supplied to the speaker 39. The speaker 39 outputs a sound corresponding to the second audio signal to be supplied to the user.

Circuits such as the printed circuit board 35, the microphone 36, the speaker 39, the liquid crystal display 38 and so on are supplied power from a drive source (a battery, not shown) within the portable telephone 201.

The user uses the keypad 37, which has ten key buttons and the like, for entering information such as telephone numbers or the like. The liquid crystal display 38 displays information such as characters, images and the like.

The shield case 34 which is connected to a ground layer of the printed circuit board 35 is arranged to surround the printed circuit board 35 in order to suppress an electromagnetic interference between the printed circuit board 35 and the antenna 31. The shield case 34 is formed using an electrical conducting material such as a metal, or a plastic material which is coated with a metal or the like on the surface thereof.

In recent years, guidelines for an electromagnetic energy partial-body absorption directed to the portable telephone have been set up in the USA, Europe and Japan, consecutively. As a quantity of evaluation for the partial-body absorption, a power absorbed in a unit mass, that is, a specific absorption rate (SAR) is used. Assuming that an electric field invaded into a biological tissue is E, a conductivity of the biological tissue is $\sigma$ and its density is $\rho$, the SAR can be expressed by the following equation (1).

$$SAR = \sigma E2/2\rho \qquad (1)$$

For example, in the partial-body absorption guideline in the USA, that is, FCC's guideline, it is specified that a peak value in an average SAR per gram tissue does not exceed 1.6 W/kg. Also, in the partial-body absorption guidelines in Europe and Japan, it is specified that a peak value in an average SAR per 10 gram-tissue does not exceed 2 W/kg.

It is described in the paper titled "Reduction of the partial-body SAR and assurance of the communication characteristics by controlling the surface current in the housing of a portable telephone" published in the Transactions of Japan Society of Applied Magnetism Vol. 23, No. 10, pages 2005-2008, 1999 that the partial-body SAR can be reduced by attaching a ferrite sheet on the metal housing of the portable telephone.

The SAR tends to increase when a transmission power of the portable telephone becomes greater, and a distance between a radiation source of waves in the portable telephone and the body of the user becomes closer. It may occur that the partial-body SAR of the portable telephone becomes maximum in a part other than the antenna, for example, in the vicinity of the shield case.

This is caused partly due to that a size of the housing is too small compared to the electromagnetic wavelength used in the radio communications, i.e., less than one wavelength thereof.

For example, in contrast to that a wavelength of electromagnetic waves at a frequency of 900 MHz is 330 mm and that at a frequency of 2 GHz is 150 mm, a size of the portable telephone in the longitudinal direction is normally 120 mm or so. The power supplied to the antenna is also supplied to the conductive shield case. Thereby, the shield case, which apparently is not the antenna, functions as a part of the antenna serving as a radiation source of electromagnetic waves.

Another cause that the partial-body SAR becomes maximum not at the antenna but in the vicinity of the shield case is indicated due to that during use of the portable telephone, the shield case comes closer to the head of the user than the antenna. Portable telephones now available on the market have become more compact and thinner sized, in comparison with the portable radio transceiver equipment, which have been in use since before the proliferation of the portable telephones. Therefore, a distance in particular between a conductive portion of the housing and the body of the user is substantially reduced in comparison with that of the portable radio equipment, thereby substantially increasing the partial-body SAR in the vicinity of the shield case thereof.

FIG. 7 shows a schematic diagram of a portable telephone 202 in which an electromagnetic wave absorption layer 41 which contains a magnetic loss material is pasted on its shield case 34. The portable telephone 202 indicated in FIG. 7 has the electromagnetic wave absorption layer 41 formed into a sheet, and contains the magnetic loss material. The other components and parts except for the above layer 41 are the same as those of the portable telephone 201 indicated with reference to FIG. 6, and are depicted with the same numerals and symbols.

In the portable telephone 202 indicated in FIG. 7, as its magnetic loss material for use in the electromagnetic wave absorption layer 41, there are cited, for example, ferrite, Permalloy, Sendust, stainless steel, silicon steel, ferro-amorphous alloys and the like.

Further, in the portable telephone 202, its electromagnetic wave absorption layer 41 is pasted on its shield case 34 via an adhesive layer on the side thereof facing the head H of the user. For example, an ultraviolet curable adhesive or a thermosetting adhesive are used as the adhesive.

In the portable telephone 202 having the above-mentioned construction, in order to reduce its SAR, for example, by approximately 20%, it becomes necessary for the electromagnetic wave absorption layer 41 including the magnetic loss material to have a thickness at least of 2–3 mm. In the portable telephone, however, a more compact-sized and light-weighted design thereof is strongly desired, therefore, respective components and parts of the portable telephone are also desired to be made further thinner and lighter-weighted.

Still further, according to the arrangement indicated in FIG. 7, although its SAR can be reduced by approximately 20% in comparison with an arrangement without the provision of the electromagnetic wave absorption layer 41, it is difficult to reduce its SAR any further.

SUMMARY OF THE INVENTION

The present invention has been contemplated to solve the above-mentioned problems associated with the prior art, and therefore, the present invention provides a portable telephone that can reduce more effectively an electromagnetic energy absorption by the human body during its use.

A portable telephone provided according to one aspect of the invention is characterized by comprising: an antenna; a microphone; a transmitting circuit; a receiving circuit; a receiver; a printed circuit board; a shield case; a housing; an electromagnetic wave absorption layer; and an electromagnetic wave reflection layer. The microphone generates a first audio signal corresponding to an input sound. The transmitting circuit modulates the first audio signal from the microphone so as to generate a first radio signal, and transmits the first radio signal via the antenna. The receiving circuit modulates a second radio signal which is modulated from a second audio signal and is received via the antenna, and produces the second audio signal. The receiver outputs sound corresponding to the second audio signal from the receiving circuit. The printed circuit board has the receiving circuit and the transmitting circuit mounted thereon. The shield case surrounds the printed circuit board in order to suppress an electromagnetic interference between the printed circuit board and the antenna, and is electrically conductive at least on its surface. The housing accommodates the microphone, the receiver and the shield case. The electromagnetic wave absorption layer includes a magnetic loss material, and is formed at least in a part between the shield case and the housing. The electromagnetic wave reflection layer contains a magnetic reflection material, and is formed between the housing and the electromagnetic wave absorption layer.

Preferably, the portable telephone according to the invention is characterized in that the above-mentioned electromagnetic wave absorption layer is formed in contact with the shield case adjacent to the receiver, and the above-mentioned electromagnetic wave reflection layer is laminated on the electromagnetic wave absorption layer.

Alternatively, the portable telephone of the invention is characterized preferably in that the above-mentioned electromagnetic reflection layer is formed in contact with the housing in the vicinity of the receiver, and the above-mentioned electromagnetic wave absorption layer is laminated on the electromagnetic wave reflection layer.

The portable telephone according to the invention is characterized in that the above-mentioned electromagnetic wave absorption layer is preferably pasted on the shield case with an adhesive.

Alternatively, the portable telephone according to the invention is characterized in that the above-mentioned electromagnetic wave reflection layer is preferably pasted on the housing in the vicinity of the receiver.

The portable telephone according to the invention is characterized in that the above-mentioned electromagnetic wave absorption layer is preferably comprised of a material having a complex magnetic permeability a real part of which is small while an imaginary part of which is large at frequencies of the above-mentioned the first and the second radio signals, and in that the above-mentioned electromagnetic wave reflection layer is preferably comprised of a material having a complex magnetic permeability a real part of which is large while an imaginary part of which is small at frequencies of the first and the second radio signals.

The portable telephone according to the invention is characterized in that the above-mentioned electromagnetic wave absorption layer thereof preferably includes a layer which is prepared by mixing the above-mentioned magnetic loss material with a synthetic resin and molded. Further, the portable telephone according to the invention is characterized in that the above-mentioned magnetic loss material thereof preferably contains at least one selected from the group consisting of ferrite, Permalloy, Sendust, stainless steel, silicon steel, and ferro-amorphous alloy.

The portable telephone according to the invention is characterized in that the above-mentioned electromagnetic wave reflection layer thereof preferably includes a layer which is prepared by mixing the above-mentioned magnetic reflection material with a synthetic resin and molded. Further, the portable telephone according to the invention is characterized in that the above-mentioned magnetic reflection material thereof preferably contains carbonyl iron. Alternatively, the portable telephone according to the invention is characterized in that the above-mentioned magnetic reflection material preferably contains ferrite.

The portable telephone according to the invention is characterized in that the above-mentioned shield case preferably has a casing made of an insulating material and an electrical conducting layer which is formed on a surface of this casing.

Thereby, it is enabled more effectively to reduce the electromagnetic energy absorption by the human body during use of the portable telephone. Advantageously, according to a lamination film of the electromagnetic wave absorption layer and the electromagnetic wave reflection layer provided in the portable telephone of the invention, the SAR thereof can be reduced substantially and more effectively than in the conventional portable telephone in which only the electromagnetic wave absorption layer made of the magnetic loss material is provided.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIGS. 2A and 2B are diagrams, in which FIG. 2A shows a complex magnetic permeability of the electromagnetic wave absorption layer in the portable telephone according to the first embodiment of the invention while FIG. 2B shows a complex magnetic permeability of the electromagnetic reflection layer therein;

DESCRIPTION OF PREFERRED EMBODIMENT

Preferred embodiments of the portable telephone according to the present invention will be described in further detail by way of example with reference to the accompanying drawings.

Preferred Embodiment 1

Figure 1:
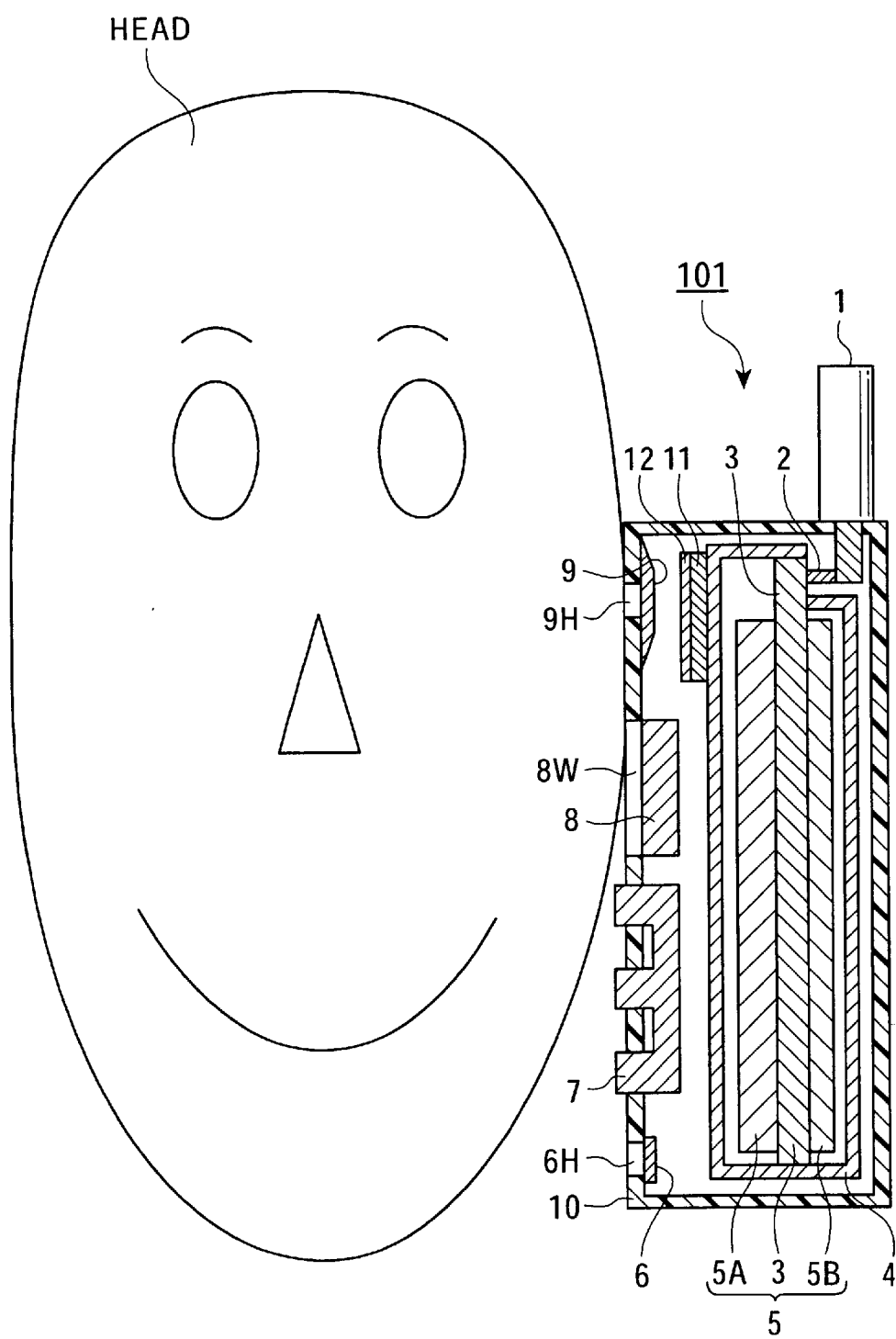
FIG. 1 is a schematic diagram indicating a portable telephone according to a first embodiment of the invention.

With reference to FIG. 1, a schematic diagram of a portable telephone according to one embodiment of the present invention is shown. As shown in this drawing, a portable telephone 101 is used in close proximity to a head (HEAD) of the user.

The portable telephone 101 of the invention has an antenna 1, a feeder section 2, a printed board 3, a shield case 4, semiconductor integrated circuits 5A, 5B, a microphone 6, a keypad 7, a liquid crystal display (LCD) 8, a speaker 9 and an insulated housing 10. Further, in a space between the shield case 4 and the housing 10, an electromagnetic wave absorption layer 11 which contains a magnetic loss material is formed in close proximity to the speaker 9. Still further, an electromagnetic wave reflection layer 12 which contains a magnetic reflection material is formed on the electromagnetic wave absorption layer 11. A size of the housing 10 in its longitudinal directions is, for example, 120 mm.

The antenna 1 for signal transmission and reception is allowed to project upward from an upper end of the housing 10, and is used to transmit a radio wave to the base station in a transmission mode and receive a radio wave from a base station in a reception mode. The antenna 1 is a retractable antenna which is retractable in the longitudinal directions of the housing 10.

On one surface of the printed board 3, the semiconductor integrated circuit 5A which includes transistors, capacitors, resisters and the like is mounted. Also, on the other surface of the printed board 3, the semiconductor integrated circuit 5B is mounted likewise.

The printed board 3 and the semiconductor integrated circuits 5A, 5B in combination constitute a printed circuit board 5. The printed circuit board 5 has a switch circuit SW, a control circuit CNT, a transmitting circuit TRS and a receiving circuit RCV mounted thereon. An interconnection between the antenna 1 and the transmitting/receiving circuits is made via the switch circuit and the feeder section 2.

The microphone 6 constitutes a voice transmitter (telephone microphone), and the speaker 9 constitutes a receiver (earphone). In the surface of the housing 10, there are provided an opening 6H for the microphone 6, an opening 9H for the speaker 9, a window 8W for the liquid crystal display 8 and so on. The housing 10 accommodates the printed circuit board 5, the shield case 4, the microphone 6, the speaker 9, the electromagnetic wave absorption layer 11 and the electromagnetic wave reflection layer 12. The microphone 9 is formed in the vicinity of one end of the housing 10 in its longitudinal directions and the speaker 9 is formed in the vicinity of the other end of the housing 10 in its longitudinal directions.

A voice or sound uttered by the user is supplied to the microphone 6 via the opening 6H. The microphone 6 to which the voice or the like originated by the user is entered generates a first audio signal corresponding to such originated sound. The printed circuit board 5 converts the first audio signal to a first radio signal. The first radio signal thus converted is transmitted to the base station via the antenna 1. In response thereto, the base station transmits a second radio signal to the portable telephone 101.

The printed circuit board 5 converts the second radio signal received via the antenna 1 into a second audio signal, and supplies the same to the speaker 9. The speaker 9 outputs an audio sound corresponding to the second audio signal to be supplied to the user. A frequency of the first and/or the second radio signals is set, for example, at 800 MHz to 900 MHz and/or 1.8 GHz to 2 GHz, respectively.

A power is supplied from a drive source (battery, which is not shown) provided within the portable telephone 101 to the circuits of the printed circuit board 5, the microphone 6, the speaker 9, the liquid crystal display 8 and the like.

The user uses the keypad 7 which has ten-key buttons and the like for entering information such as telephone numbers to be called or the like. The liquid crystal display 8 displays information such as characters, images and the like.

The shield case 4 which is connected to a ground layer of the printed circuit board 5 surrounds the circumference of the printed circuit board 5 in order to suppress an electromagnetic interference between the printed circuit board 5 and the antenna 1.

The shield case 4 is formed using a conductive material such as a metal, or using a plastic material the surface of which is coated with a metal. Further, instead of coating the metal on the surface of the plastic, metal plating of nickel or the like may be adopted. Thereby, at least the surface of the shield case 4 is rendered electrically conductive.

According to the invention, partly in a region of the surface of the shield case 4 which comes closer to the head of the user when in use of the portable telephone, there is formed a lamination layer of the electromagnetic wave absorption layer 11 and the electromagnetic wave reflection layer 12. The electromagnetic wave absorption layer 11 is adhered on the surface of the shield case 4, for example, with a conductive adhesive. As this conductive adhesive, such an adhesive may be used that is prepared by mixing powders of aluminum or copper with a synthetic resin such as epoxy or the like. Alternatively, the electromagnetic wave absorption layer 11 may be pasted using a double-faced adhesive tape or the like.

Figure 7:
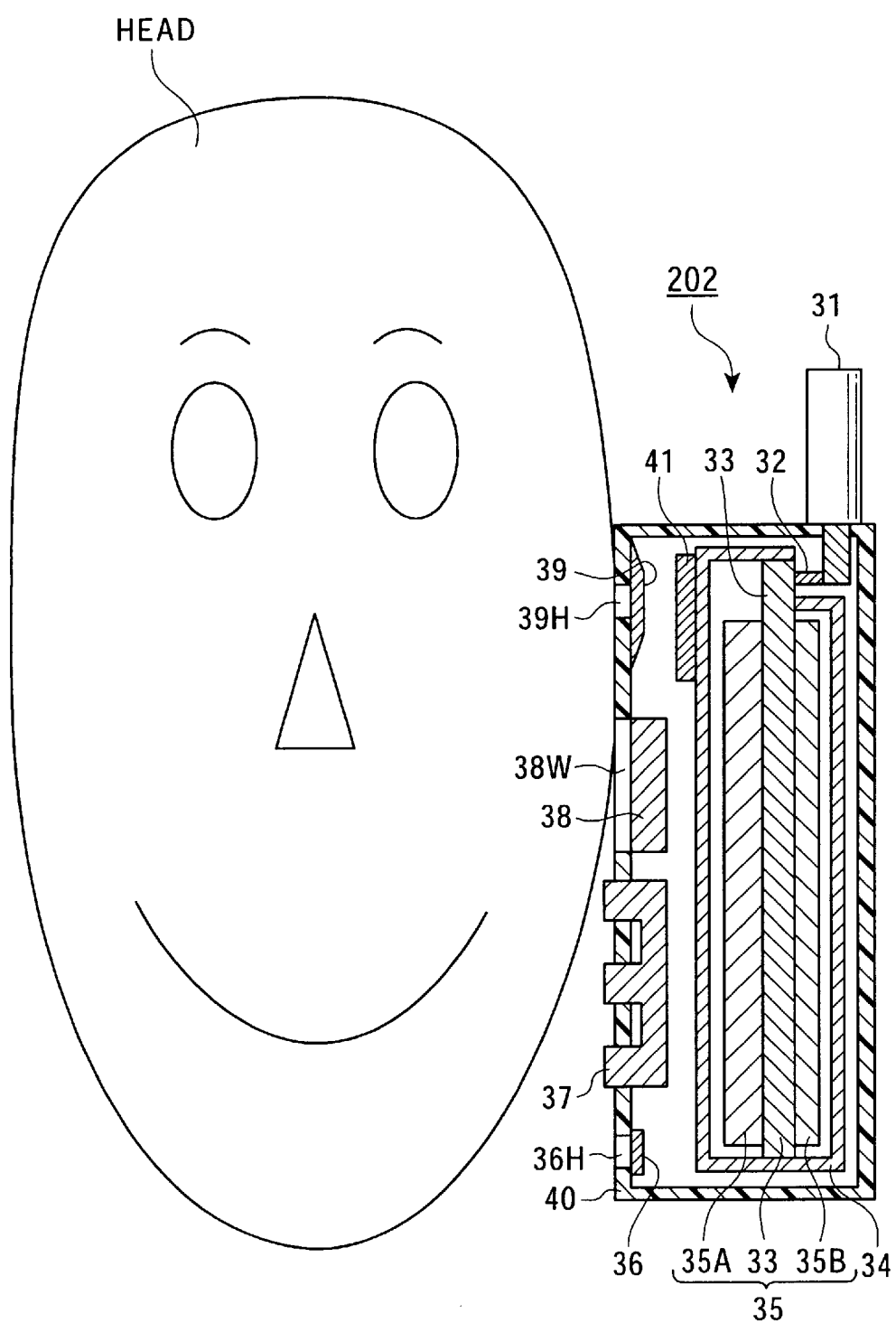
FIG. 7 is a schematic view of another conventional portable telephone.

In the conventional portable telephone 202 as shown in FIG. 7, an electromagnetic wave absorption layer 41 containing a magnetic loss material is formed, for example, in a part of the surface of its shield case 34 for the purpose of reducing the SAR. As this magnetic loss material, such a material having a complex magnetic permeability is used, in which a real part is small while an imaginary part (corresponds to a loss) is large.

In contrast to the above, in the portable telephone 101 according to the preferred embodiment of the invention shown in FIG. 1, the electromagnetic wave reflection layer 12 is formed further on the surface of the electromagnetic wave absorption layer 11 which is made of the same material as that of the above-mentioned electromagnetic wave absorption layer 41. It should be noted that as the magnetic reflection material for this electromagnetic wave reflection layer 12, a low loss magnetic material having a complex magnetic permeability is used, in which a real part thereof is large while an imaginary part thereof (corresponds to its loss) is as small as possible.

When an ac magnetic field H is applied to a magnetic substance, and if there exists a phase lag (a loss angle δ) in a change of a magnetic flux density B, its magnetic permeability $\mu$ is expressed by the following equation (2).

$$\mu = B/H = |\mu|e^{-j\delta} \quad (2).$$

A complex magnetic permeability $\mu$ expressed in complex terms is given by the following equation (3).

$$\mu = \mu' - \mu'' = |\mu|\cos\delta - j|\mu|\sin\delta \quad (3).$$

Here, δ=0 corresponds to a dc permeability. Because cos δ decreases with an increase of δ, its real part $\mu'$ of the complex permeability decreases. On the other hand, $\mu'' = |\mu|\sin\delta$ corresponds to a loss of energy. Because δ increases with an increase of the frequency, its imaginary part $\mu''$ also increases.

The real part $\mu'$ and the imaginary part $\mu''$ of the complex permeability in the magnetic substance are caused to change at a specific frequency under the influence of magnetic resonance and the like.

Figure 2A:
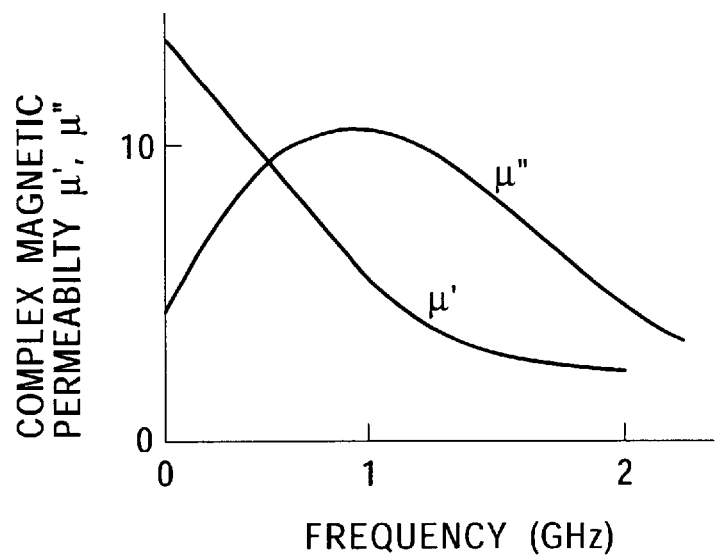

FIG. 2A is a schematic diagram indicating respective complex permeability $\mu'$ and $\mu''$ of the electromagnetic wave absorption layer 11 in the portable telephone embodying the invention. As shown in FIG. 2A, because a high frequency band used for the first and the second radio signals (for example, in a range of 1 to 2 GHz) and its resonance frequencies are close, the real part $\mu'$ in the complex magnetic permeability of the electromagnetic wave absorption layer 11 decreases while the imaginary part $\mu''$ thereof increases in excess of a particular frequency.

Figure 2B:
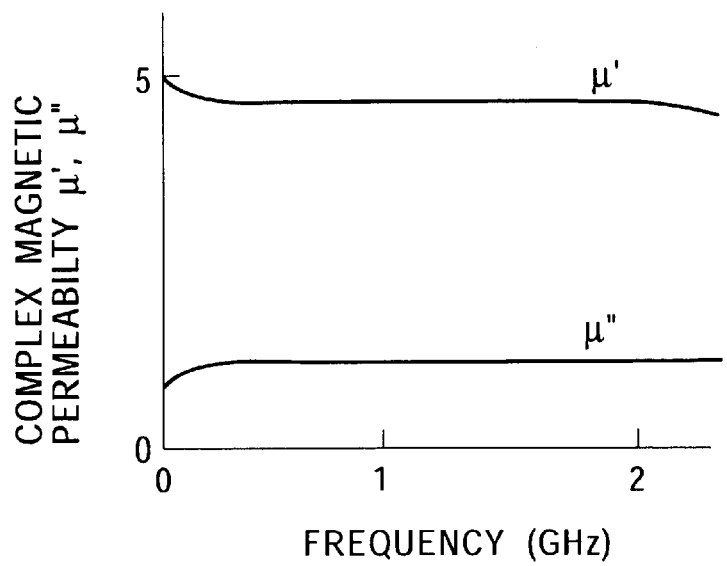

On the other hand, FIG. 2B shows schematically respective complex permeability $\mu'$ and $\mu''$ of the electromagnetic wave reflection layer 12. As shown in FIG. 2B, because the high frequency band (in the region of 1 GHz to 2 GHz) used for the first and the second radio signals and its resonance frequencies are remote, the real part $\mu'$ of the complex permeability in the electromagnetic wave reflection layer 12 is great while the imaginary part $\mu''$ thereof is small.

As its magnetic loss material to be contained in the electromagnetic wave absorption layer 11 in the portable telephone embodying the invention, powders or compressed powders, for example, of ferrite, Permalloy, Sendust, stainless steel, silicon steel, ferro-amorphous alloys or the like are used. Powders of such high-loss magnetic materials are mixed with resin such as chlorinated polyethylene, silicone or the like, and molded into a predetermined shape.

As its low-loss magnetic material for the electromagnetic wave reflection layer 12, powders or compressed powders, for example, of carbonyl iron, a low-loss ferrite or the like are used. Powders of such low-loss magnetic materials are mixed with a resin such as chlorinated polyethylene, silicone or the like, and molded into a predetermined shape. For example, by mixing carbonyl iron having a grain size of approximately 5 to 20 $\mu$m with chlorinated polyethylene in a ratio that the content of carbonyl iron becomes 80 wt %, and by molding the same into a sheet form, the electromagnetic wave reflection layer 12 is provided.

The electromagnetic wave absorption layer 11 and the electromagnetic wave reflection layer 12 are formed separately, bonded together with an adhesive or the like, and cut into a preferred size. Otherwise, after mixing raw materials of the electromagnetic wave absorption layer 11 and the electromagnetic wave reflection layer 12, respectively, they may be molded and laminated, then hardened in an integrated state. After hardening of the resin, a laminate of these two layers is cut into a desired size.

With reference to FIG. 7, in order to reduce the partial-body SAR, for example, by 20% with an electromagnetic wave absorption layer 41 formed of a magnetic loss material, it is necessary for this electromagnetic wave absorption layer 41 to have a size of 3 to 5 square cm and a thickness of 2 to 3 mm. In contrast, in order to reduce the partial-body SAR by the same degree as above by provision of the electromagnetic wave reflection layer 12 according to the invention, it is sufficient for this electromagnetic wave reflection layer 12 to have a size of 3 to 5 square cm and a thickness as thin as 0.5 mm. Therefore, when the electromagnetic wave absorption layer 11 and the electromagnetic wave reflection layer 12 are laminated, even if the thickness of the electromagnetic wave absorption layer 11 is reduced to be thinner than the conventional structure (shown in FIG. 7) of the electromagnetic wave absorption layer 11, the SAR can be reduced likewise.

Still further, if the electromagnetic wave absorption layer 11 is formed into the same size of 3 to 5 square cm and 2 to 3 mm thickness as that of the conventional, then the electromagnetic wave reflection layer 12 is formed on the surface thereof to a thickness of 0.5 mm, its SAR can be reduced as much as by 50% in comparison with a case without the provision of both the electromagnetic wave absorption layer 11 and the electromagnetic wave reflection layer 12.

Generally, in the portable telephone 101, the size in the longitudinal direction of the housing 10 is relatively short with respect to the wavelength of the radio signals, and the conductive part of the shield case 4 and the like function as a part of the antenna. Therefore, when receiving or transmitting electromagnetic waves via the antenna 1, a current flows in the surface of the conductive part of the shield case 4 or the like, which results in an increase in the partial-body SAR.

However, advantageously according to the portable telephone 101 embodying the invention, a laminate of the electromagnetic wave absorption layer 11 and the electromagnetic wave reflection layer 12 is provided in a part of the surface of the shield case 4 adjacent to the speaker 9, where its surface current becomes maximum. Therefore, the electromagnetic waves to be radiated toward the body of the user outside the housing 10 is partly absorbed in the electromagnetic wave absorption layer 11, and mostly reflected by the electromagnetic wave reflection, layer 12. Thereby, its SAR can be reduced substantially and effectively.

Figure 3:
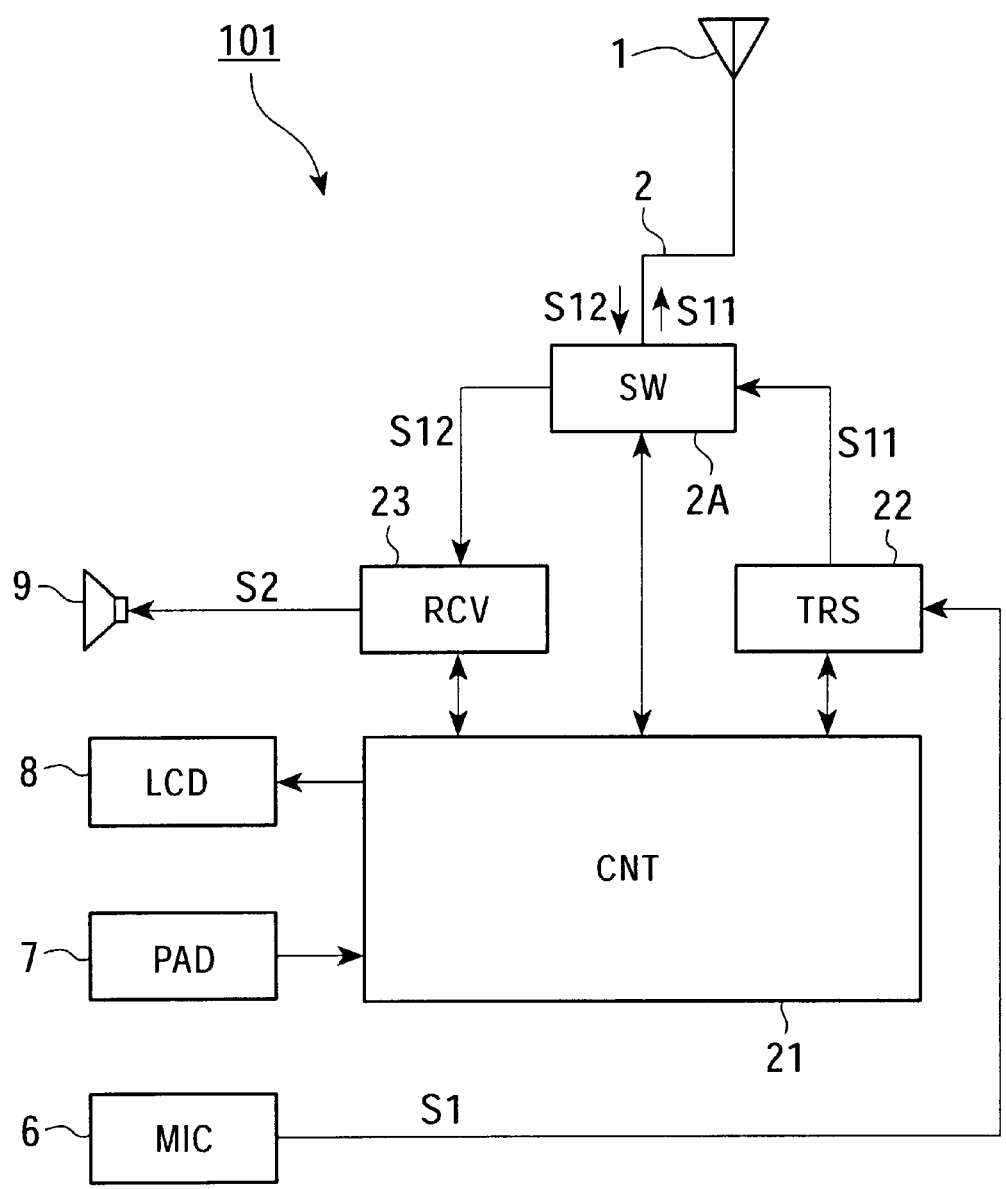
FIG. 3 is a schematic block diagram of the portable telephone according to the first embodiment of the invention.

Now, with reference to FIG. 3, a schematic block diagram depicting an overall operation of the portable telephone 101 of FIG. 1 is shown. The switch circuit (SW) 2A, the control circuit (CNT) 21, the transmitting circuit (TRS) 22 and the receiving circuit (RCV) 23 shown in FIG. 3 are comprised of the semiconductor integrated circuits 5A, 5B and the printed board 3 indicated in FIG. 1, and they are mounted on the printed circuit board 5 of FIG. 1.

A voice or sound uttered by the user is input into the microphone (MIC) 6, and a first audio (acoustic) signal S1 corresponding to this input sound is generated by an electro-acoustic conversion. The transmitting circuit (TRS) 22 modulates and converts the first audio signal S1 into a first radio signal S11, and outputs this first radio signal S11 to the switch circuit (SW) 2A. The switch circuit (SW) 2A supplies the first radio signal S11 sent from the transmitting circuit (TRS) 22 to the antenna 1 via the feeder section 2. The antenna 1 converts the first radio signal S11 from its electric signal to an electromagnetic wave to be propagated to the base station.

Alternatively, a second radio signal S12 which is modulated from a second audio (acoustic) signal and propagated is input to the antenna 1. The antenna 1 supplies this second radio signal S12 to the switch circuit (SW) 2A via the feeder 2. The switch circuit (SW) 2A supplies the second radio signal S12 from the antenna 1 to the receiving circuit (RCV) 23.

The receiving circuit (RCV) 23 demodulates the second radio signal S12 to generate a second audio (acoustic) signal S2, and outputs this second audio signal S2 to the speaker 9. The speaker 9 outputs an audible sound corresponding to the second audio signal S2 by electro-acoustic conversion of the second audio signal S2 to be supplied to the ears of the user.

The control circuit (CNT) 21 performs an overall control over the entire circuits of the portable telephone 101, including the transmitting circuit (TRS) 22, the receiving circuit (RCV) 23, the switch circuit (SW) 2A and the liquid crystal display (LCD) 8. Also, the control circuit (CNT) 21 performs a transmission/reception sequence control, a transmission/reception protocol control and so on.

Information is input to the control circuit (CNT) 21 via the keypad (PAD) 7. On the basis of information input via the keypad (PAD) 7, the control circuit (CNT) 21 carries out various signal processing. The control circuit (CNT) 21 which also performs display control of the liquid crystal display (LCD) 8 displays the information entered via the keypad 7 or the like on a display screen of the LCD.

Advantageously, according to the portable telephone embodying the invention described hereinabove, the electromagnetic energy conventionally having been absorbed in the head of the human body can be substantially reduced. The electromagnetic energy radiated from inside the portable telephone toward the head of the human body is absorbed partly in the electromagnetic wave absorption layer 11, and mostly reflected by the electromagnetic wave reflection layer 12. A part of the electromagnetic energy reflected from the electromagnetic wave reflection layer 12 is radiated from the antenna 1. Therefore, the laminate obtained by laminating the electromagnetic wave absorption layer 11 and the electromagnetic wave reflection layer 12 contributes to the improvements in its antenna radiation efficiency as well as its communication characteristics. For example, according to the portable telephone embodying the invention described hereinabove, the antenna efficiency thereof is improved by 20%.

Preferred Embodiment 2

Figure 4:
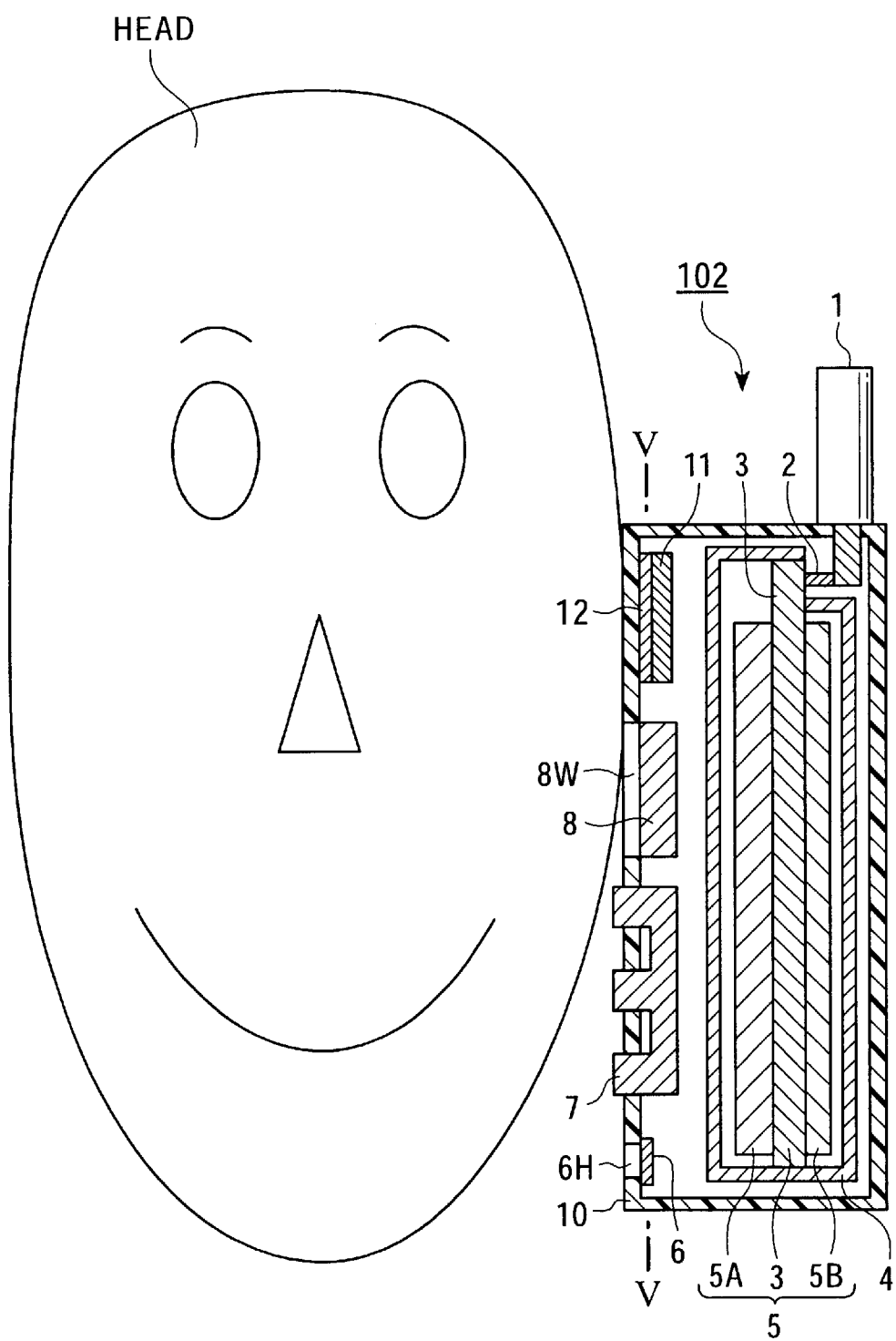
FIG. 4 is a schematic diagram indicating a portable telephone according to a second embodiment of the invention.

With reference to FIG. 4, a schematic diagram of a portable telephone according to a second embodiment of the invention is shown. As shown in FIG. 4, in this portable telephone 102 according to the second embodiment of the invention, its electromagnetic wave absorption layer 11 and its electromagnetic wave reflection layer 12 are provided, not on the surface of the shield case 4 as practiced in the portable telephone 101 of the first embodiment of the invention indicated in FIG. 1, but on a side of its housing 10.

The electromagnetic wave reflection layer 12 thereof is formed firmly in contact with the housing 10 thereof. The electromagnetic wave absorption layer 11 thereof is formed in contact with the electromagnetic wave reflection layer 12 thereon, and closer to its shield case 4 than the electromagnetic wave reflection layer 12 is. A thickness of the electromagnetic wave absorption layer 11 is set, for example, at 2 to 3 mm, and a thickness of the electromagnetic wave reflection layer 12 is set, for example, at 0.5 mm.

Although not shown in FIG. 4, a speaker 9 and an opening 9H for the speaker 9 are provided in the portable telephone 102 in FIG. 4 likewise the portable telephone 101 of FIG. 1.

Figure 5:
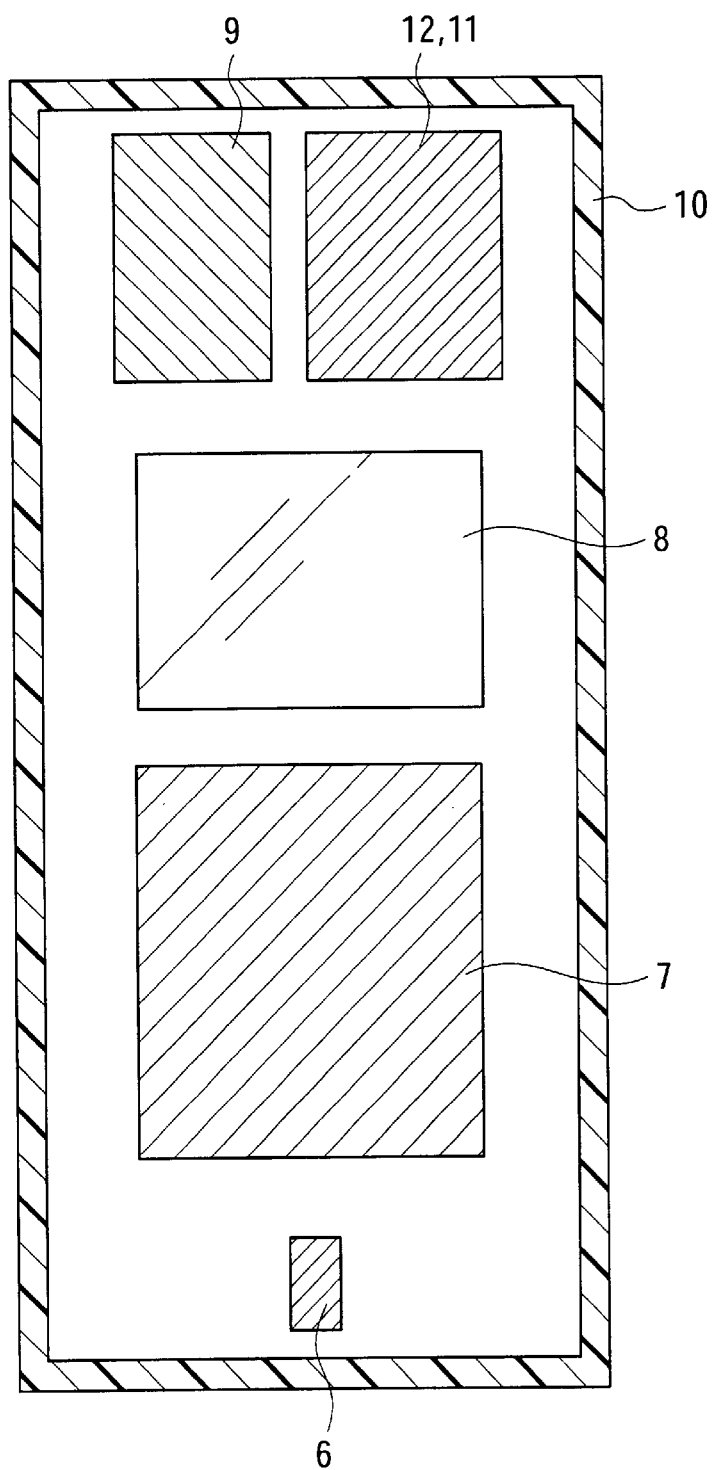
FIG. 5 is a cross-sectional view taken along a line V—V in FIG. 4.
Figure 6:
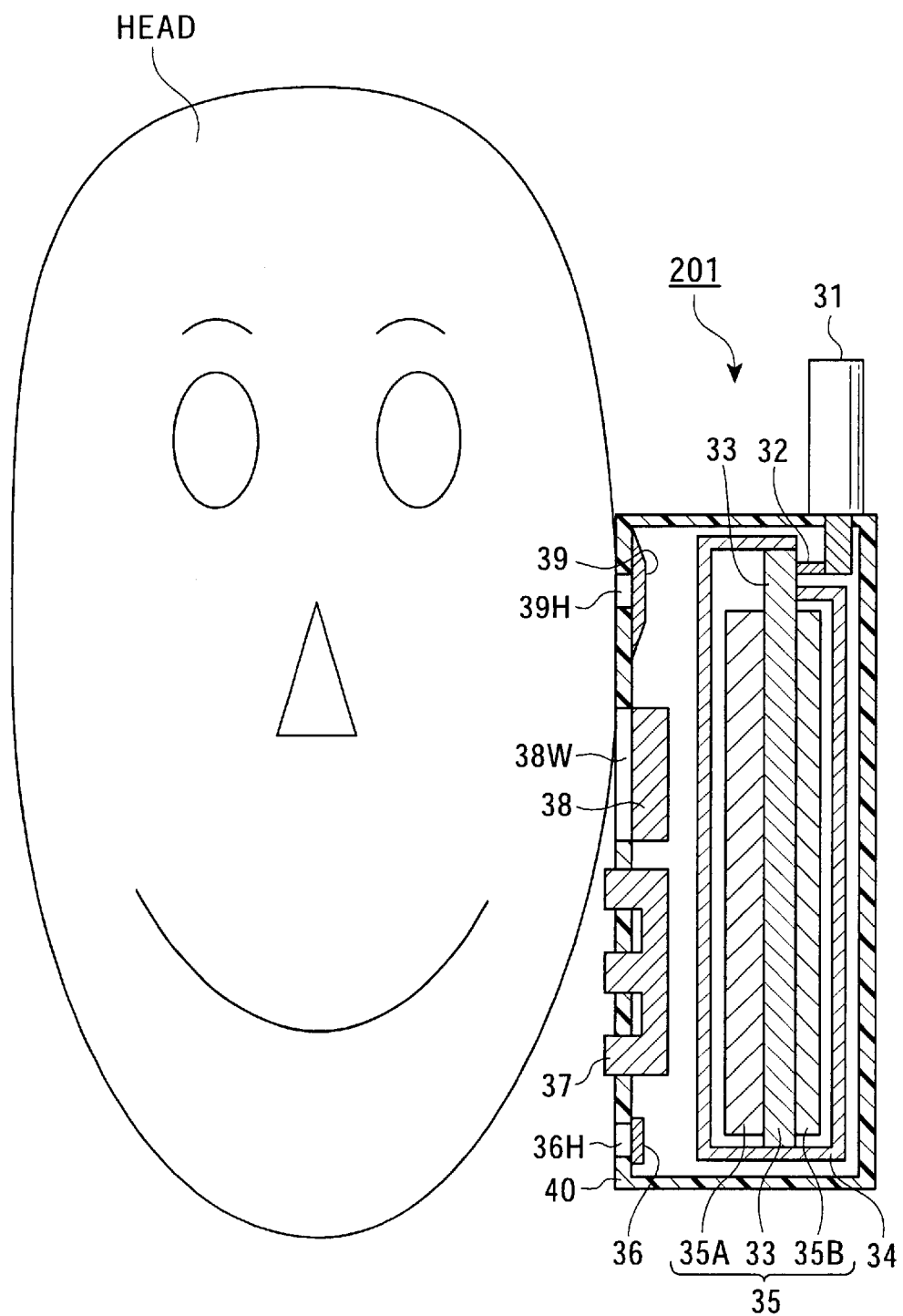
FIG. 6 is a schematic view of a conventional portable telephone.

FIG. 5 is a cross-sectional view taken along a line V—V in FIG. 4. As shown in FIG. 5, in the portable telephone 102 according to the second embodiment of the invention, a laminate of its electromagnetic wave reflection layer 11 and its electromagnetic wave absorption layer 12 is formed adjacent to the speaker 9. Namely, according to the portable telephone 102 of the invention, the laminate of the electromagnetic wave reflection layer 11 with the electromagnetic wave absorption layer 12 and the speaker 9 are formed in juxtaposition with each other in a vertical direction with respect to the plane of FIG. 4.

The other arrangements thereof, namely, its antenna 1, feeder 2, printed board 3, shield case 4, semiconductor integrated circuits 5A, 5B, microphone 6, keypad 7, liquid crystal display 8, speaker 9 and insulated housing 10 are common to those of the portable telephone 101 in FIG. 1. The printed board 3, the semiconductor integrated circuits 5A and 5B, in combination, constitute its printed circuit board 5. Its switch circuit, control circuit, transmitting and receiving circuits which are mounted on the printed circuit board 5 are the same and function likewise those of the portable telephone 101 according to the first embodiment of the invention, therefore, their descriptions are omitted.

By use of the portable telephone 102 according to the second embodiment of the invention described hereinabove, the SAR can be reduced substantially and effectively likewise the portable telephone according to the first embodiment of the invention. For example, if the electromagnetic wave absorption layer 11 and the electromagnetic wave reflection layer 12 each having the above-mentioned respective thickness are provided, its resultant SAR can be reduced as much as by 50% in comparison with an instance without the provision of the above two layers.

Further, because the electromagnetic energy radiated from inside the portable telephone is partially reflected by the electromagnetic wave reflection layer 11 and radiated from the antenna 1, its antenna radiant efficiency and communication characteristics are substantially improved.

Although the invention has been described in its preferred form with a certain degree of particularity, obviously many changes, variations and combinations are possible therein. It is therefore to be understood that any modifications will be practiced otherwise than as specifically described herein without departing from the scope of the present invention. For example, a mixing ratio between the magnetic reflection material and the synthetic resin or the like can be modified appropriately according to a frequency band to be used.

Advantageously, according to the portable telephone embodying the invention, the electromagnetic energy radiated from the portable telephone during its use and absorbed by the human body can be minimized more effectively.

What is claimed is:

1. A portable telephone comprising:

an antenna;

a microphone for generating a first audio signal corresponding to a sound entered to said microphone;

a transmitting circuit for modulating said first audio signal from said microphone to generate a first radio signal, and transmitting said first radio signal via said antenna;

a receiving circuit for receiving a second radio signal which is modulated from a second audio signal via said antenna, and demodulating said second radio signal to reproduce said second audio signal;

a receiver for outputting a sound corresponding to said second audio signal from said receiving circuit;

a printed circuit board on which said receiving circuit and said transmitting circuit are mounted;

a shield case which surrounds said printed circuit board for suppressing an electromagnetic interference between said printed circuit board and said antenna, and has an electrical conductivity at least on its surface;

a housing for accommodating said microphone, said receiver and said shield case;

an electromagnetic wave absorption layer containing a magnetic loss material, provided at least in a portion between said shield case and said housing; and an electromagnetic wave reflection layer containing a magnetic reflection material, provided between said housing and said electromagnetic wave absorption layer.

2. The portable telephone according to claim 1, wherein:

said electromagnetic wave absorption layer is formed in contact with said shield case, and adjacent to said receiver; and said electromagnetic wave reflection layer is formed as laminated on said electromagnetic wave absorption layer.

3. The portable telephone according to claim 2, wherein said electromagnetic wave absorption layer is pasted on said shield case with an adhesive.

4. The portable telephone according to claim 1, wherein:

said electromagnetic wave reflection layer is formed in contact with said housing, in the vicinity of said receiver, and said electromagnetic wave absorption layer is laminated on said electromagnetic wave reflection layer.

5. The portable telephone according to claim 3, wherein said electromagnetic wave reflection layer is pasted on said housing with an adhesive in the vicinity of said receiver.

6. The portable telephone according to claim 1, wherein:

said electromagnetic wave absorption layer comprises a material having a complex magnetic permeability a real part of which is small while an imaginary part of which is large at frequencies of said first and said second radio signals; and said electromagnetic wave reflection layer comprises a material having a complex magnetic permeability a real part of which is large while an imaginary part of which is small at frequencies of said first and said second radio signals.

7. The portable telephone according to claim 6, wherein said electromagnetic wave absorption layer includes a layer which is molded after mixing said magnetic loss material with a synthetic resin.

8. The portable telephone according to claim 7, wherein said magnetic loss material contains at least one selected from the group of materials consisting of ferrite, Permalloy, Sendust, stainless steel, silicon steel and ferro-amorphous alloy.

9. The portable telephone according to claim 6, wherein said electromagnetic wave reflection layer includes a layer which is molded after mixing said magnetic reflection material with a synthetic resin.

10. The portable telephone according to claim 9, wherein said magnetic reflection material contains carbonyl iron.

11. The portable telephone according to claim 9, wherein said magnetic reflection material contains ferrite.

12. The portable telephone according to claim 1, wherein said shield case comprises a case made of an insulating material, and a conductive layer formed on a surface of said case.

13. The portable telephone according to claim 1, wherein an interface between said electromagnetic wave absorption layer and said electromagnetic wave reflection layer is bonded with adhesive.

14. The portable telephone according to claim 1, wherein said electromagnetic wave absorption layer and said electromagnetic wave reflection layer are molded and laminated as an integral lamination film.

* * * * *